United States Patent [19]

Pai et al.

[11] Patent Number: 5,444,756

[45] Date of Patent: Aug. 22, 1995

[54] X-RAY MACHINE, SOLID STATE RADIATION DETECTOR AND METHOD FOR READING RADIATION DETECTION INFORMATION

[75] Inventors: Joseph Y. Pai, Woodbury, Minn.; Choon-Woo Kim, Incheon, Rep. of Korea

[73] Assignee: Minnesota Mining and Manufacturing Company, St. Paul, Minn.

[21] Appl. No.: 291,771

[22] Filed: Aug. 17, 1994

Related U.S. Application Data

[63] Continuation-in-part of Ser. No. 193,807, Feb. 9, 1994, abandoned.

[51] Int. Cl.$^6$ .............................................. H05G 1/64
[52] U.S. Cl. .................................... 378/98.8; 378/96; 378/108
[58] Field of Search ................. 378/96, 97, 98, 98.7, 378/98.8, 108; 250/370.08, 370.09

[56] References Cited

U.S. PATENT DOCUMENTS

| | | | |
|---|---|---|---|
| 3,934,146 | 1/1976 | Mester et al. | 378/96 |
| 3,986,033 | 10/1976 | Mester et al. | 250/402 |
| 4,101,775 | 7/1978 | Ensslin et al. | 250/409 |
| 4,176,275 | 11/1979 | Korn et al. | 250/213 |
| 4,905,265 | 2/1990 | Cox et al. | 378/98.8 |
| 5,105,087 | 4/1992 | Jagielinski | 250/370.09 |
| 5,144,141 | 9/1992 | Rougeot et al. | 250/369 |
| 5,340,975 | 8/1994 | Vogelgesang | 250/205 |

OTHER PUBLICATIONS

Ardran, G. M. et al., "Constancy of Radiation Output During Diagnostic X-Ray Exposure", 51 *British Journal of Radiology* 867-874 (Nov. 1978).

Okkalides, "Abberations [sic] in X-Ray Output Waveforms of Radiological Generators", 15 *Journal of Radiology* 248-251 (1992).

Cox, John D. and Williams, Donald W, "Direct X-Ray Sensing CCD Array for Intraoral Dental X-Ray Imaging System". No Date.

*Primary Examiner*—David P. Porta
*Attorney, Agent, or Firm*—Gary L. Griswold; Walter N. Kirn; William D. Bauer

[57] ABSTRACT

A solid state radiation detector having an improved method of reading data from individual sensors and an x-ray machine configured with such a solid state radiation detector. At least one sensor of the solid state radiation detector is designated as a reference sensor. The output of the reference sensor is read until it reaches a predetermined threshold. Once the threshold has been reached, a timer determines when the predetermined x-ray exposure time is completed. Upon completion, the sensors of the solid state radiation sensor are read. Thus, all sensors may be read at the proper time to achieve maximum output in spite of an unknown and variable warm-up period for the x-ray tube following activation and possibly an unknown exposure time. Alternatively, once the output of the reference has reached the predetermined threshold, the output of that reference continues to be monitored to determine when the output of the reference sensor falls below a second predetermined threshold. At approximately that time, all sensors of the solid state radiation detector are read.

18 Claims, 10 Drawing Sheets

X-RAY MACHINE, SOLID STATE RADIATION DETECTOR AND METHOD FOR READING RADIATION DETECTION INFORMATION

RELATED APPLICATION

This application is a continuation-in-part of U.S. patent application Ser. No. 08/193,807, Joseph Pal and Choon-Woo Kim, entitled "X-Ray Machine, Solid State Radiation Detector and Method for Reading Radiation Detector Information", filed Feb. 9, 1994 now abandoned.

TECHNICAL FIELD

The present invention relates generally to radiation detectors and, more particularly, to solid state x-ray radiation detectors.

BACKGROUND OF THE INVENTION

The use of x-rays in the diagnosis of medical ailments and for other purposes is well known. Typically, an x-ray machine is located in a medical facility and is arranged to expose an object to be x-rayed, e.g., a portion of the human body such as a leg, hand or internal organ, to a predetermined amount, or dose, of radiation. The amount of radiation which passes through the object being x-rayed depends upon the characteristics of the object. Thus, the amount of x-ray radiation passing through the object depends on the interior shadow cast by the object and, hence, is representative of an x-ray image of the object. A cassette containing a photosensitive film is positioned opposite the x-ray source. A conventional cassette typically contains one or more phosphor screens which are excitable by x-rays to produce radiation (light) to which the film is sensitive and which is primarily responsible for the formation of a latent image in the photographic film.

The x-ray film typically uses silver halide technology which is expensive and which may be subject to further wet chemical processing steps. Additionally, there is an associated time lag between exposure and developing, after which it may be determined that another exposure is necessary to adequately image the area being diagnosed. An inadequate image could be caused, for example, by overexposure or patient movement during exposure. Film systems can only be used once, require a light-controlled environment and have associated disposal and environmental concerns due to the need for developing solutions.

Alternatively, the cassette may contain photosensitive media which can be read externally by excitation of the latent image by a laser source or by detection of the latent image by induction of charge movement. The remainder of the x-ray machine operates conventionally. However, the x-ray film, involving wet or dry chemistry, is not needed, Solid state radiation detectors convert the information in the x-ray radiation into electronic information which may be stored and transmitted. The electronic information may be read directly from an electronic display apparatus, typically a conventional monitor, may be printed to form a hard copy of the image or appropriately stored on magnetic or optical media, for example.

Solid state radiation detectors, e.g., x-ray detectors, divide the image into a plurality of image pixels. Individual radiation detectors convert the received radiation into an electronic signal. Collectively all of the individual radiation detectors provide a matrix of electronic signals, representative of the image. Typically, solid state detection information is represented digitally. Solid state radiation detectors are well known in the art. One example is the solid state radiation detector described in U.S. Pat. No. 5,105,087, Jagielinski, Large Solid State Sensor Assembly Formed From Smaller Sensors.

The medical practitioner using the x-ray machine usually prescribes a predetermined "dose" of radiation to the object being x-rayed. This amount of radiation is dependent upon, for example, the type and thickness of the object being x-rayed. A chest x-ray of a 300 pound man might require more radiation than an x-ray of child's finger. The amount of radiation is controlled in the x-ray machine by varying the intensity of the radiation output and by varying the length of time which the object is exposed to the radiation. The intensity of the radiation output is typically controlled by varying the voltage and/or the current supplied to the x-ray generator. The length of time is typically controlled simply by turning the x-ray generator on and off, or activating and deactivating the x-ray generator. It is desirable to minimize the x-ray dose due to the detrimental effects of x-rays on humans and animals.

However, there is considerable variation in radiation output among typical x-ray machines. Ardran, G. M. et al, "Constancy of Radiation Output During Diagnostic X-Ray Exposure", 51 *British Journal of Radiology* 862–874 (November 1978) describes some typical variations in radiation output. Also, Okkalides, "Abberations [sic] in X-Ray Output Waveforms of Radiological Generators, 15 *Journal of Radiology* 248–251 (1992) describes how variations in the rectification of power supply voltages affect x-ray tube output.

U.S. Pat. No. 4,101,775, Ensslin et al, X-Ray Tube Current Stabilizing Circuit, describes a technique designed to stabilize the x-ray tube with a circuit which causes the filament current of a x-ray tube to vary inversely to the tube current so as to maintain constant tube current regardless of moderate variations in line voltage. The circuit described in Ensslin et al, however, corrects for only one variable affecting x-ray tube output.

U.S. Pat. No. 5,144, 141, Rougeot et al, Photodetector Scintillator Radiation Imager, describes an array of photodetectors in which the intensity of light striking individual photomultipliers varies dependent on the distance of the photomultiplier from the point where the incident radiation interacted with a scintillator to produce the initial light burst. Each sub-group, consisting of four photodetectors, has a detect and hold circuit for amplifying and storing signals generated by the photodetectors. Multiplexing means samples the inputs stored.

Other methods of x-ray detection use a photoconductive plate, such as a thick film selenium x-ray plate, which is exposed to x-ray radiation in the conventional manner as with silver halide film. The x-ray plate, as a result of the exposure to x-ray radiation, contains a latent image of the object being imaged. The x-ray plate is then scanned with a focused laser beam to read the latent image stored in the plate. Such a method and system for accomplishing this method is disclosed in U.S. Pat. No. 4, 176,275, Korn et al. The exposure of the x-ray plate to the x-ray radiation creating the latent image is entirely conventional. The scanning of the x-ray plate to read out the latent image is a completely separate step and is fundamentally different from the x-ray radiation exposure step. There are variations in intensity of the laser beam used to read out the latent image in the x-ray plate for which compensation should be made. One mechanism to adjust for these laser beam variations is described in co-pending U.S. patent application Ser. No. 08/011,332, Vogelgesang et al, Method and Apparatus for Reducing the Effects of Laser Noise and for Improving Modulation Transfer Function in Scanning a Photoconductive Surface.

An x-ray generator generally has an initialization period following being turned on or following its activation. During this initialization period, the amount of radiation generated is variable and indeterminate. Because of this variation, it is conventional to wait until the x-ray generator has stabilized before beginning to count the duration of the predetermined exposure time. This initialization time, or period, is added to the predetermined exposure time and the total time of activation is represented by the initialization time plus the exposure time.

This known technique for determining the activation time for the x-ray generator is greatly variable. Individual x-ray generators, even those of the same make and model, vary significantly in the length of the initialization time period. Further, the length of the initialization period is a function of the length of time since the x-ray generator was last activated, the temperature of the environment, the age of the x-ray tube and other factors. Thus, the precise amount of radiation produced by the radiation generator and to which the object is exposed is greatly indeterminate.

In a conventional process for production of an x-ray image to be interpreted by a radiologist, the experience of the medical technician operating the x-ray machine and a trial and error approach are combined to produce an image which will sufficiently disclose the interior of the object being x-rayed. While it is the object of the technician to produce an x-ray image with the minimum time exposure of the patient to x-ray radiation, many variables make the task difficult.

SUMMARY OF THE INVENTION

The present invention provides a solution to the indeterminate initialization period of radiation generators. Using the present invention, the length of the initialization period is determined with confidence. Since the initialization period of the radiation generator and/or the time which is optimum for read-out can be precisely determined, the length or duration of exposure to the radiation can be precisely controlled. This results in a much more controllable image generation thus removing a significant amount of potential error associated with image acquisition. By measuring the exact response of the radiation detector panel, data acquisition can occur at the optimum time to ensure a consistent and repeatable radiographic image.

In one embodiment, the present invention is an x-ray machine for producing an x-ray having an x-ray tube powered by electrical power and producing x-ray radiation with the x-ray tube having a variable warm-up time period. A controller controls an exposure time during which the x-ray tube produces the x-ray radiation. A layer of phosphor receives the x-ray radiation and produces an output based upon the amount of the x-ray radiation received. A solid state radiation detector having a plurality of solid state sensors arranged in an array of sensors consisting of a plurality of rows and a plurality of columns is responsive to the output of the layer of phosphor. Sensing means is coupled to each of the plurality of solid state sensors for sensing the output of the solid state sensors. The sensing means reads the output of a sensor. The controller applies electrical power to the x-ray tube. The sensing means continues to read the output of the sensors and determines a time $t_2$ based upon the output of the sensors. The sensing means reads the output of the plurality of solid state sensors at time $t_3$ which is equal to the time $t_2$ plus the exposure time. A recording means is responsive to the sensing means and records the value of the output of the plurality of solid state sensors at time $t_3$. A reproducible x-ray image is produced in spite of the x-ray tube having a variable warm-up time period.

In an alternative embodiment, the present invention is a solid state radiation detector adapted to detect radiation from a radiation source having a variable initialization period following a time $t_1$. An array of solid state sensors consisting of a plurality of rows and a plurality of columns is adapted to be responsive to radiation from the radiation source. At least one of the solid state sensors is designated a reference sensor. Sensing means is coupled to each of the solid state sensors for sensing the output of the solid state sensors. The sensing means reads the output of the reference sensor at the time $t_1$. The sensing means reads the output of the reference sensor after time $t_1$ and determines a time $t_2$ based upon the output of the reference sensor as compared with the predetermined threshold of the reference sensor. The sensing means reads the output of the solid state sensors at a time $t_3$ which is equal to the time $t_2$ plus the exposure time. Recording means is responsive to the sensing means and records the value of the output of the plurality of solid state sensors at time $t_3$.

In an alternative embodiment, the present invention is a solid state radiation detector adapted to detect radiation from a radiation source having a variable initialization period. The radiation source is intended to expose the radiation detector for a predetermined exposure time. A plurality of solid state sensors are arranged in an array of sensors adapted to be responsive to radiation from the radiation source, each of the plurality of solid state sensors producing an output. At least one of the plurality of solid state sensors is designated a reference sensor. Determining means are provided for detection when the radiation source has completed the initialization period by monitoring the output of the reference detector. Reading means reads the output of the plurality of solid state sensors when the determining means determines that the warm-up period has been completed and the predetermined exposure period has been completed.

In an alternative embodiment, the present invention is a method of reading radiation detection information from a solid state radiation detector having a plurality of solid state sensors arranged in an array consisting of a plurality of rows and a plurality of columns. Each of the plurality of solid state sensors produces an output. The radiation detector is responsive to radiation from a radiation source having a variable initialization period beginning at a time $t_1$. At least one of the plurality of solid state sensors is designated as a reference sensor. The output of the reference sensor is sensed at and following the time $t_1$. A time $t_2$ is determined based upon the output of the reference sensor as compared with the output of the reference sensor at time $t_1$. The output of the plurality of solid state sensors is read at a time $t_3$ which is equal to the time $t_2$ plus the exposure time. The value of the output of the plurality of solid state sensors is recorded at the time $t_3$.

Preferably, the time $t_2$ in the determining step is determined by the time at which the value of the output of the reference sensor minus the value of the output of the reference sensor at time $t_1$ exceeds a predetermined threshold.

In an alternative embodiment, the present invention is a method of reading radiation detection information from a solid state radiation detector having a plurality of solid state sensors with each of the plurality of solid state sensors producing an output. The radiation detector is responsive to radiation from a radiation source having a variable initialization period. The radiation source is intended to expose the radiation detector for a predetermined exposure period. At least one of the plurality of solid state sensors is designated as a reference sensor. The method determines when the radiation source has completed the initialization period by monitoring the output of the reference detector and reads the output of the plurality of solid state sensors when the determining step indicates that the warm-up period has been completed and the predetermined exposure period has been completed.

Preferably, the time in the determining step is determined by the time at which the value of the output of the reference sensor minus the value of the initial output of the reference sensor exceeds a predetermined threshold.

Preferably, the initialization period comprises a warm-up period of the radiation source.

In an alternative embodiment, the present invention provides an x-ray machine for producing an x-ray having an x-ray tube powered by electrical power and producing x-ray radiation. The x-ray tube has a variable warm-up time period following an activation time. A layer of phosphor receives the x-ray radiation and produces an output based upon the amount of the x-ray radiation received. A solid state radiation detector has a plurality solid state sensors, the detector being responsive to the output of the layer of phosphor, with each of the plurality of solid state sensors producing an output and has at least one reference sensor producing an output. A sensing means is coupled to each of the plurality of solid state sensors for sensing the output of the solid state sensors. A determining means is coupled to the output of the reference sensor for first determining when the output of the reference sensor exceeds a first predetermined threshold and then determining a readout time when the output of the reference sensor falls below a second predetermined threshold. A recording means is responsive to the sensing means for recording the value of the output of the plurality of solid state sensors at the readout time whereby an x-ray image is produced in spite of the x-ray tube having a variable warm-up time period.

In an alternative embodiment, the present invention provides a solid state radiation detector adapted to detect radiation from a radiation source having a variable initialization period following an activation time. An array of solid state sensors is adapted to be responsive to radiation from the radiation source, with each of the solid state sensors producing an output. At least one reference sensor produces an output. A sensing means is coupled to each of the solid state sensors for sensing the output of the solid state sensors. A determining means is coupled to the output of the reference sensor for first determining when the output of the reference sensor exceeds a first predetermined threshold and then determining a readout time when the output of the reference sensor falls below a second predetermined threshold. A recording means is responsive to the sensing means for recording the value of the output of the plurality of solid state sensors at readout time.

Preferably, the initialization period comprises a warm-up period of the radiation source.

In an alternative embodiment, the present invention provides a solid state radiation detector adapted to detect radiation from a radiation source having a variable initialization period following an activation time. A plurality of solid state sensors are arranged in an array and adapted to be responsive to radiation from the radiation source, with each of the plurality of solid state sensors producing an output. At least one reference sensor is provided. A sensing means is coupled to each of the solid state sensors for sensing the output of the solid state sensors. A determining means is coupled to the output of the reference sensor for first determining when the output of the reference sensor exceeds a first predetermined threshold and then determining a readout time when the output of the reference sensor falls below a second predetermined threshold. A recording means is responsive to the sensing means for recording the value of the output of the plurality of solid state sensors at readout time.

In an alternative embodiment, the present invention provides a method of reading radiation detection information from a solid state radiation detector having a plurality solid state sensors, with each of the plurality of solid state sensors producing an output. The radiation detector is responsive to radiation from a radiation source having a variable initialization period following an activation time. At least one reference sensor is provided. The output of the reference sensor is sensed following the activation time. When the output of the reference sensor exceeds a first predetermined threshold is determined. A readout time when the output of the reference sensor falls below a second predetermined threshold is then determined. The value of the output of the plurality of solid state sensors is recorded at the readout time.

BRIEF DESCRIPTION OF THE DRAWINGS

The foregoing advantages and features of the present invention can be more readily understood by reference to the accompanying drawings in which.

DETAILED DESCRIPTION OF THE PREFERRED EMBODIMENTS

Figure 1:
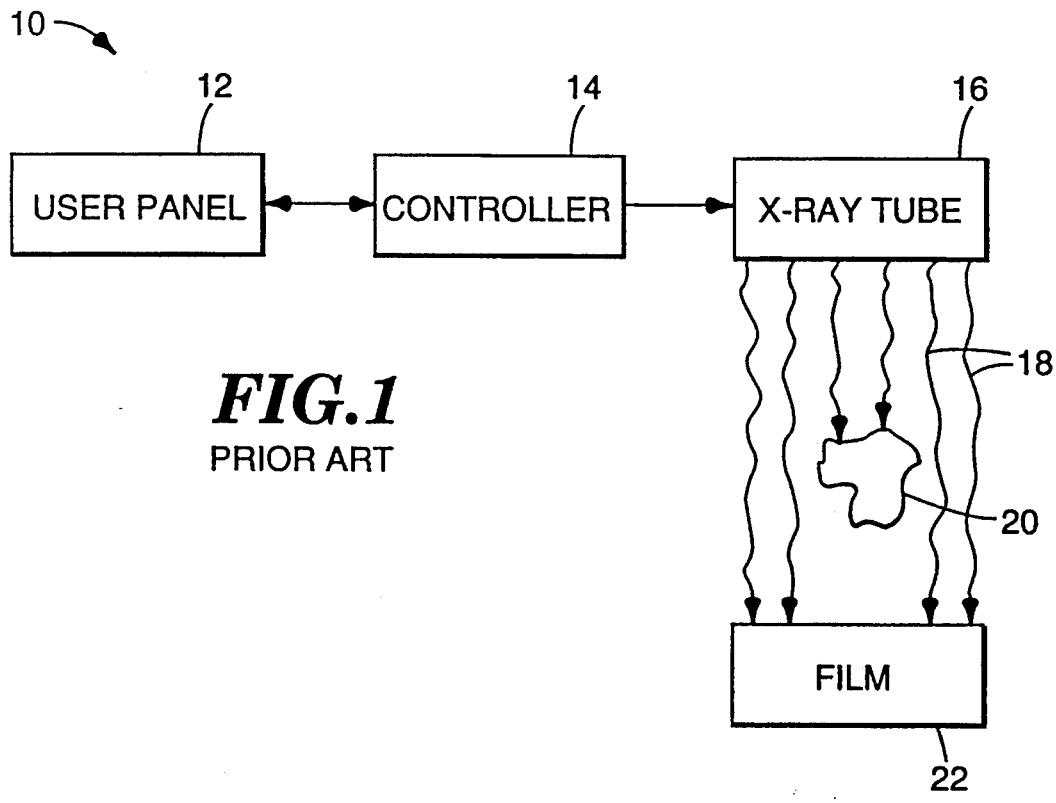
FIG. 1 shows a block diagram of a prior art x-ray machine.

Conventional x-ray machines are well known. As shown in FIG. 1, x-ray machine 10 consists of user panel 12 through which the x-ray or other medical technician may make machine settings to properly operate x-ray machine 10. Typically, user panel 12 also displays information about the operation of x-ray machine 10. Controller 14 accepts input from the user panel 12 and sends status information back to user panel 12. Upon appropriate input from user panel 12, controller 14 activates x-ray tube 16 at an appropriate time and at an appropriate level to generate x-ray radiation 18. Object 20, such as a portion of the body, to be imaged by x-ray machine 10 is positioned appropriately between x-ray tube 16 and film cassette 22. X-ray radiation 18 impinges upon object 20 and some of x-ray radiation 18 is absorbed by object 20. Some x-ray radiation 18, however, passes through or around object 20 and strikes film cassette 22. Since some of x-ray radiation is blocked, or partially blocked by object 20, the amount of x-ray radiation reaching film cassette 22 provides an image of object 20 on film cassette 22. Conventional film cassette 22 is standard x-ray silver halide film such as 3M XLA or GT, manufactured by Minnesota Mining and Manufacturing Company, St. Paul, Minn. Film cassette 22 is then processed conventionally by wet or dry chemistry to fully develop the image of object 20 in film cassette 22. Film cassette 22 may then be viewed by medical professionals such as a radiologist.

Figure 10:
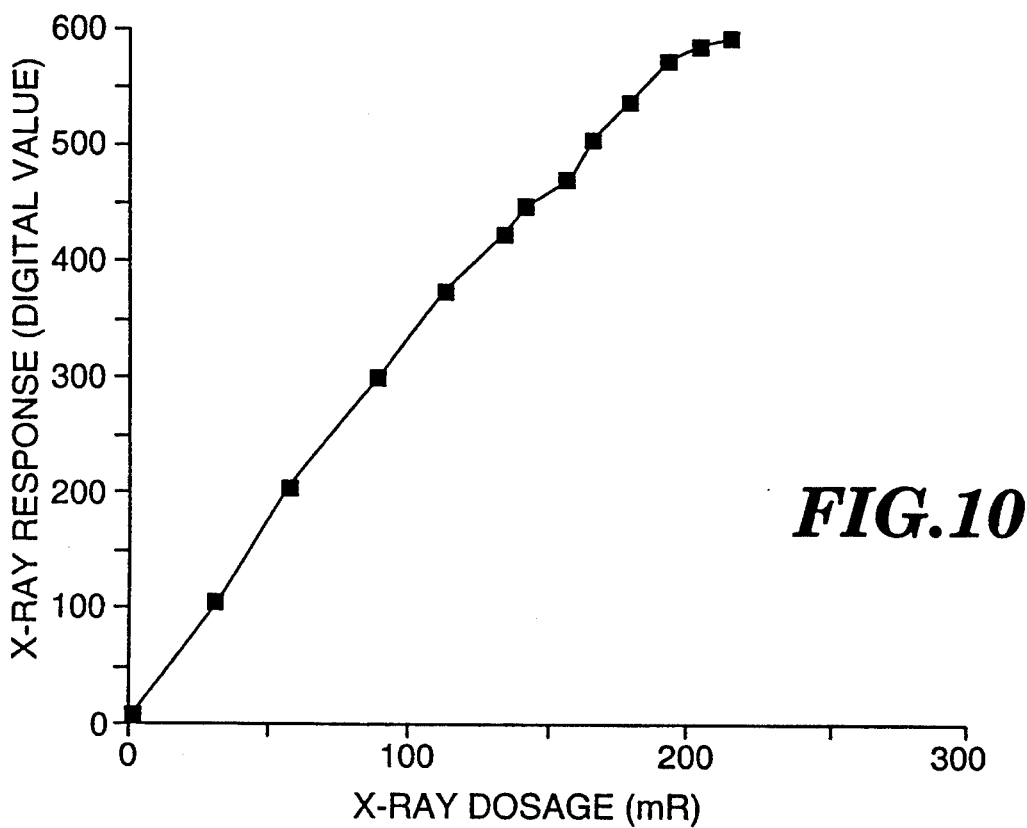
FIG. 10 is a graph illustrating the results of using the test apparatus of FIG. 7 with a solid state radiation detector constructed in accordance with one embodiment of the present invention.

An example of a conventional x-ray machine 10 such as illustrated in FIG. 10 is model HFQ-6000 x-ray machine, manufactured by Bennett X-Ray Corporation, Copiague, N.Y.

While the operation of conventional x-ray machine 10 has been described as being used by medical personnel to image a portion of the body, it is to be recognized and understood that x-ray machines may also be advantageously used in other environments such as industrial applications for non-destructive testing.

Figure 2:
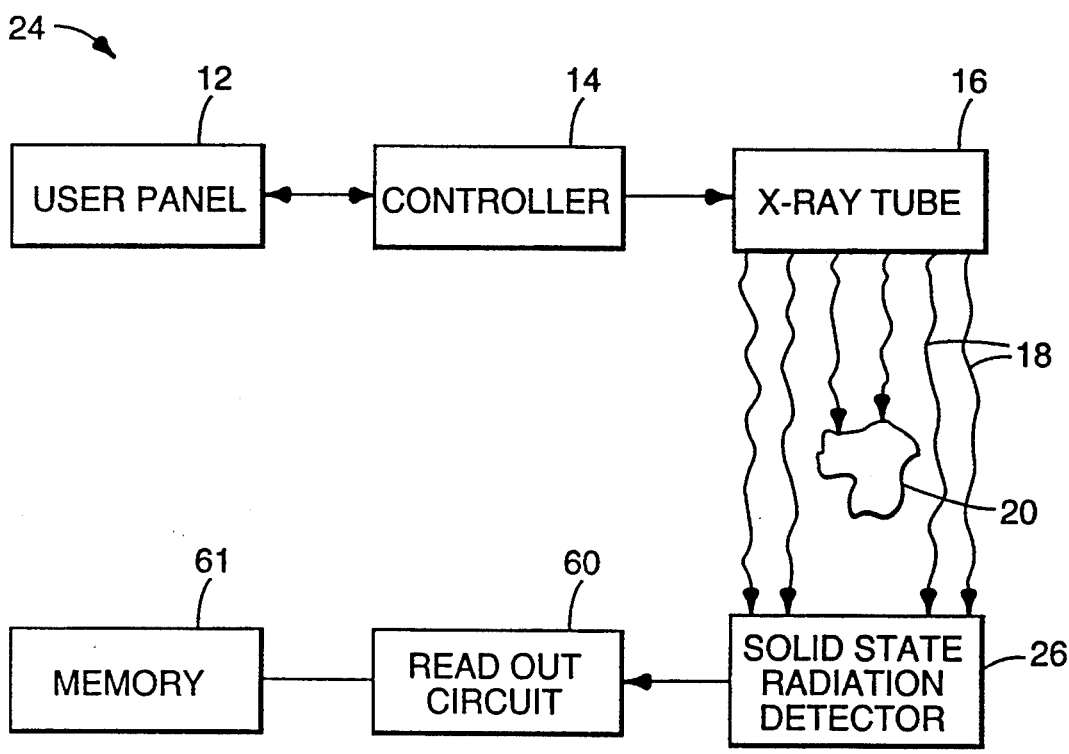
FIG. 2 shows a block diagram of an x-ray machine using the solid state radiation detector of the present invention.

FIG. 2 is a block diagram of the x-ray machine 24 using a solid state radiation detector 26 as in the present invention. As in conventional x-ray machine 10, the medical technician may make machine settings through user panel 12 to properly operate x-ray machine 24. User panel 12 also displays information about the operation of x-ray machine 24. Controller 14 accepts input from the user panel 12 and sends status information back to user panel 12. Upon appropriate input from user panel 12, controller 14 activates x-ray tube 16 at an appropriate time at an appropriate level to generate x-ray radiation 18. Again object 20, such as a portion of the body, to be imaged by x-ray machine 24 is positioned appropriately with respect to x-ray tube 16. However, instead of using conventional x-ray film cassette 22 as in x-ray machine 10, solid state radiation detector 26 is positioned to receive radiation 18 which is not absorbed by object 20.

Solid state radiation detector 26 converts x-ray radiation 18 which impinges upon it directly into electrical signals representative of the image of object 20. By converting the x-ray radiation directly into electrical signals, preferably digital electrical signals, the use of conventional silver halide x-ray film cassette 22 is eliminated. Generally, solid state radiation detector 26 consists of an array of photodetectors arranged in a plurality of rows and columns. Each juncture of row and column represents a single picture element, or pixel, of the image produced. Conventional solid state radiation detectors are well known. An example of a preferred solid state radiation detector 26 is shown and described in co-pending U.S. patent application Ser. No. 08/163,147, Nang Tran, Choon-Woo Kim and Joseph Pal, filed Dec. 6, 1993, entitled Solid State Radiation Detection Panel Having Tiled Photosensitive Detectors Arranged to Minimize Edge Effects Between Tiles, which is hereby incorporated by reference.

Because solid state radiation detector 26 is utilized in place of conventional film cassette 22 with conventional user panel 12, conventional controller 14 and conventional x-ray tube 16, solid state radiation detector 26 is controlled independently and there is no electrical connection required between solid state radiation panel 26 and the remaining components of the conventional x-ray machine, namely user panel 12, controller 14 and x-ray tube 16. This enables radiation detector 26 to be easily retrofit into existing conventional x-ray machine 10.

Figure 3:
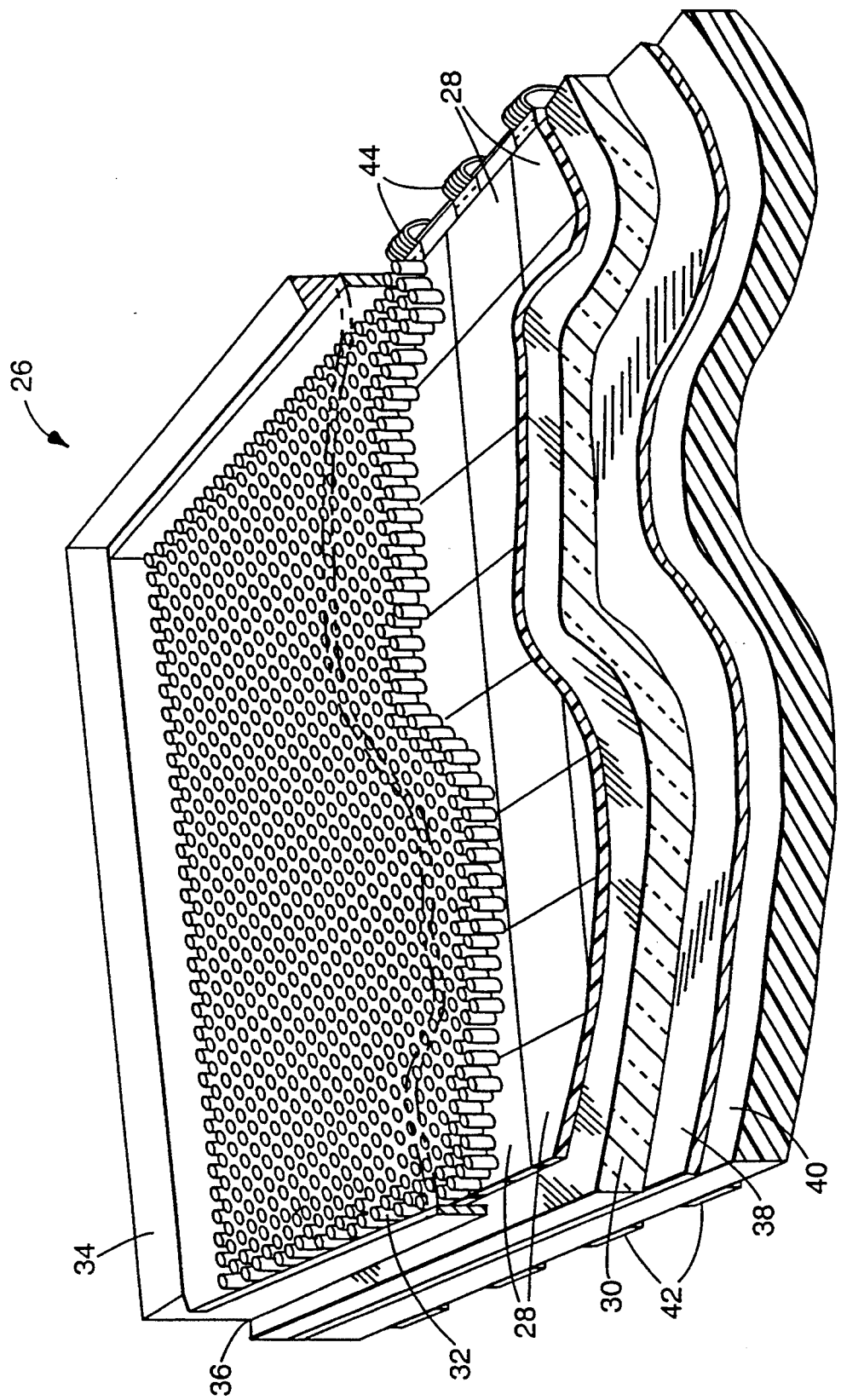
FIG. 3 illustrates a solid state radiation detector constructed in accordance with the present invention.

An example of a solid state radiation detector 26 is illustrated in FIG. 3. Individual photosensitive modules 28 are arranged in a plurality of rows and columns and are mounted on a flat substrate 30, such as a glass plate. Each individual module, or tile, 28 is responsive to incident radiation from the top as illustrated in FIG. 3. On top of the photosensitive modules 28 is a layer of phosphor 32. Covering the top of solid state radiation detector 26 is a protective front plate 34 which protects the underlying phosphor layer 32 and photosensitive tiles 28 with a hermetic seal 36. Below substrate 30 is an optional lead separator 38 designed to protect underlying electronic components from radiation exposure. Below separator 38 and opposite from the side of incident radiation is a printed wiring board 40 containing appropriate electronic components 42 associated with solid state radiation detector 26. Flexible cable 44 provides an electrical connection between electrical contacts on the common substrate 30 connecting to electrical components within each tile 28 and electronic components 42 mounted on printed wiring board 40 opposite separator 38.

In operation, x-ray radiation 18 (after being modulated according to the object being imaged) is incident on the top surface (the surface containing front plate 34). The radiation passes through front plate 34 and strikes the layer of phosphor 32 which operates as a scintillation material converting the x-ray radiation into visible light. Visible light emitted by the phosphor 32 is detected by an array of photosensitive detectors in each of tiles 28. The photosensitive detectors convert the visible radiation into an electrical signal which may be read-out to associated electronic circuits. The value, typically digital, of the electronic signals then represents an image-wise pattern of the object being imaged.

In addition to the photosensitive detectors in each tile 28, other peripheral circuitry is used to address and read-out the charge held by individual photosensitive detectors. Within each photosensitive detector there are three TFT (thin film transistors) switches, one for each of the x and y directions and one for read-out purposes.

In a preferred embodiment, each tile 28 consists of silicon photodiodes and thin film transistor (TFT) devices formed on silicon wafers, with a dimension of 2.125 inches×2.125 inches (5.4 centimeters×5.4 centimeters). Silicon photodiodes provide the individual photosensitive elements. Preferably, each tile 28 contains a 624 by 624 array of photosensitive detectors. The addressing and read-out circuitry is distributed within each sensor tile 28. Tiles 28 are thinned out to a thickness of 12-40 microns while maintaining the edges at the original thickness of the silicon wafer (preferably 360 to 400 microns) for purposes of handling ease. A p+ implantation and implantation annealing at 850° Centigrade is done to form a built-in field to drive the carriers away from the surface and to enhance blue light efficiency. Aluminum patterns are then conventionally formed using microlithography. Tiles 28 are then mounted on phosphor 32. After proper alignment is achieved, tiles 28 are held in place by a vacuum system and the edges surrounding tiles 28 are trimmed away. Common substrate 30 is prepared with large metal tracks, with typical track widths in the range of 300-700 microns. Patterned common substrate 30 is then placed on top of the array of tiles 28 and a solder bump operation is performed to connect the metal pads in tiles 28 to the metal tracks on common substrate 30.

Alternatively, phosphor 32 may be coated on a separate sheet or glass substrate and then glued to the array of sensor tiles 28. Alternatively, the entire array of tiles 28 may be coated with phosphor 32. Phosphor 32 may consist of conventional phosphors or pre-structured phosphors, such as gadolinium oxide sulfide doped with terbium or europium or other phosphors known to those skilled in the art. Another alternative phosphor 32 is an alkali halide which can be deposited directly on sensor tiles 28, using thin film deposition techniques known in the art. A non-inclusive representative alkali halide phosphor is thallium doped cesium iodide.

The output from solid state radiation detector 26 in FIG. 2 is read, collected in read-out circuit 60 which conventionally detects, or reads, the voltage produced by each photodetector of solid state radiation detector 26, either individually or through any commonly known multiplexing arrangement. Data obtained by read-out circuit 60 is stored, or recorded, in memory 61. Alternatively, the data could be displayed conventionally on a screen such as a cathode ray tube or transmitted to a remote site.

Figure 4:
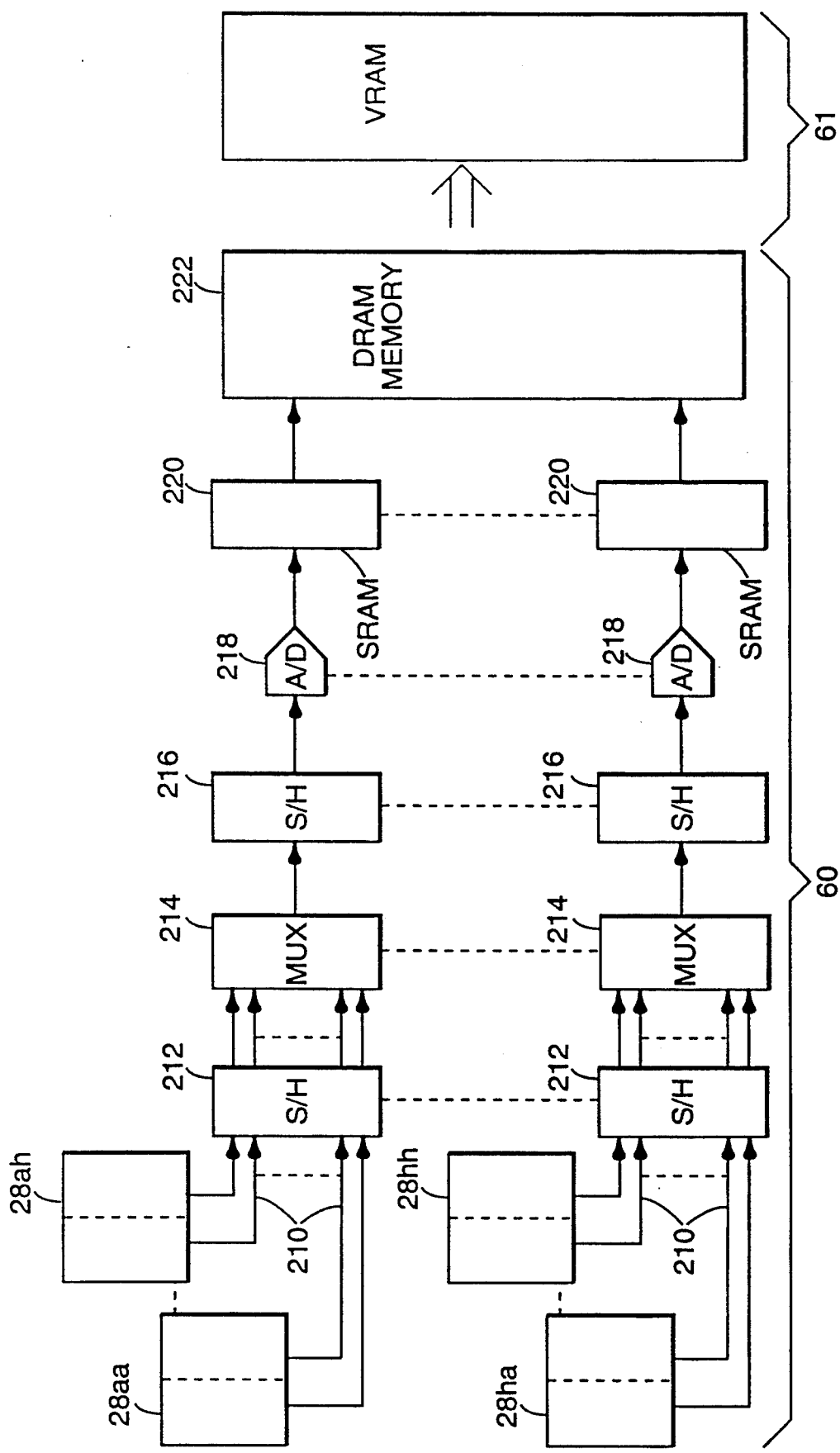
FIG. 4 is a block diagram illustrating the construction of a read-out circuit used in conjunction with the solid state radiation detector.

The construction and operation of read-out circuit 60 and memory 61 is illustrated in FIG. 4. As noted above, solid state radiation detector 26 is constructed of individual tiles 28. The entire solid state radiation detector 26 has 64 tiles 28 arranged in 8 rows and 8 columns having an overall dimension of approximately 17 inches by 17 inches. Portions of tiles 28 are illustrated in FIG. 4 with tile 28aa representing the first tile in the first row, tile 28ah representing the last tile in the first row, tile 28ha representing the first tile in the last row and tile 28hh representing the last tile in the last row. An entire tile 28 consists of an array of 624 pixels by 624 pixels. Each tile 28aa through 28hh is divided into two sections with a separate data readout line 210 for each section. Thus each row of tiles, e.g. tiles 28aa through 28ah, has a total of 16 read-out data lines 210.

Each pixel within each tile 28aa-28hh is individually selected by x and y select lines (not shown). Data for the pixels selected is sent along readout data lines 210 to sample and hold circuit 212. Sample and hold circuit 212 is an analog circuit which temporarily holds for signal level appearing on read-out data lines 210. For each row tiles 28, the 16 lines of data from sample and hold circuit 212 is passed through multiplexer 214 and again temporarily held in another analog sample and hold circuit 216, A multiplexer is used to decrease the number of analog-to-digital converters needed. Alternatively, tiles 28 could be read-out faster by increasing the number analog-to-digital converters. The signal for each pixel from sample and hold circuits 216 is converted to 16 bits of digital data by analog-to-digital converters 218. The digitized data is then sequentially stored in SRAM (static random access memory) 220. Each SRAM 220 contains data on one row of tiles 28. Data from all SRAMs 220 is then stored in DRAM (dynamic random access memory) 222 which hold data for all rows of tiles 28, or data for the entire solid state radiation detector 26.

Since each tile 28 was divided into two sections and two read-out data lines 210 were provided for each tile 28 and since data is collected in SRAMs 220 sequentially and transferred directly to DRAM 222, although all of the data is contained in DRAM 222, the data is "out of order". The data is then reassembled in a conventional manner using software (not shown) and re-stored in video memory 61 which contains data representing the image of object 20 being imaged.

Figure 5:
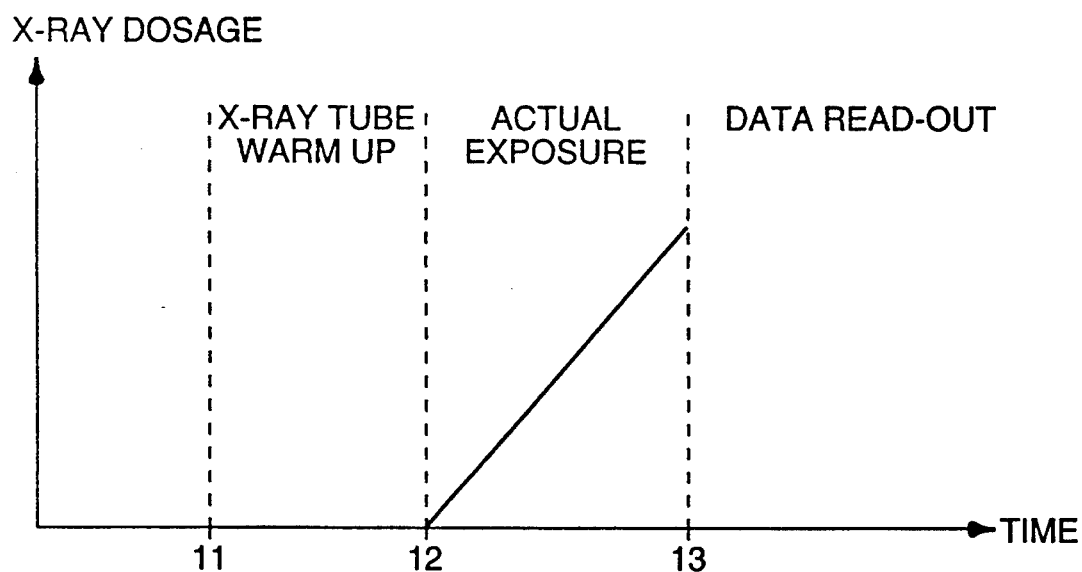
FIG. 5 is a timing diagram showing the timing of one embodiment of the solid state radiation detector of FIG. 3.

FIG. 5 illustrates a timing diagram showing the x-ray exposure scheme of solid state radiation detector 26. The abscissa of the timing diagram of FIG. 5 is time and the ordinate represents an amount of x-ray dosage delivered to object 20. After the x-ray technician has set the required parameters, such as x-ray exposure time, current and voltage, into x-ray machine 24, x-ray machine 24 is switched on at time $t_1$. Actual exposure time of the object begins at time $t_2$. The time period $(t_2-t_1)$ between time $t_1$ and time $t_2$ represents the amount of time required for x-ray tube 16 to warm up. This delay time is greatly variable and depends upon the values of the required parameters, the ambient temperature, the length of time since x-ray tube 16 was last activated and other factors. Thus, the delay time is not often known in advance or predictable.

The predetermined (set by the operator) object exposure time $(t_3-t_2)$ starts at time $t_2$ and ends at time $t_3$. Data from each of the photodetectors associated with solid state radiation detector 26 should be "read-out" at or near time $t_3$ since the x-ray dose reaches its maximum at that point. If data were "read-out" substantially before time $t_3$, the data would not have its maximum value since the maximum exposure dose would not have been yet reached. If data were "read-out" substantially after time $t_3$, image acquisition time would be increased and data might not have its maximum value due to possible decay or saturation in the exposure detectors.

Figure 6:
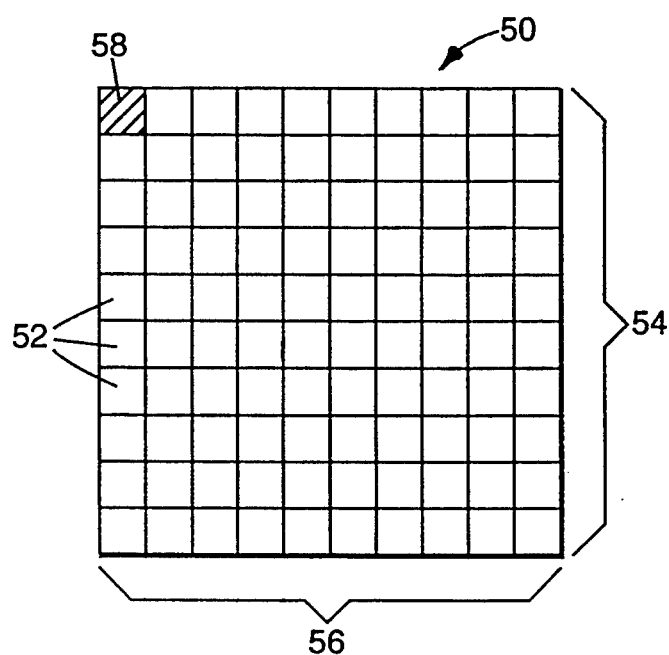
FIG. 6 is a schematic representation of sensor elements utilized with the present invention.

In order to avoid the problems associated with variable warm-up time period $(t_2-t_1)$, at least one pixel element is designated as a reference pixel. This is simply illustrated in FIG. 6 which schematically represents an array 50 of photodetectors (sensors) 52 being arranged in a plurality of rows 54 and columns 56. Although a preferred embodiment of the invention would include many more sensors 52, an array 50 consisting of ten rows 54 and ten columns 56, hence having 100 sensors 52 is shown. One sensor is designated as reference sensor 58. Although, any pixel could be used to be a reference sensor, it is preferred that an edge or corner pixel (or a pixel near an edge or near a corner) be used as a reference pixel so as to minimize the likelihood of blockage of x-ray radiation 18 from reaching reference sensor 58. It is preferred that the maximum amount of x-ray radiation possible reach reference sensor 58.

It is recognized and understood that more than one reference sensor 58 could be designated in a single solid state radiation detector 26. Corner pixels, for example, could be designated. Alternatively, any or all of the regular sensors, perhaps representing all pixels, could be used as the reference sensor or sensors. It is also to be recognized and understood that reference sensor 58 could be located separate from and externally located with respect to array 50. In the case where reference sensor 58 is external to array 50, it is only necessary that reference sensor 58 be physically positioned to be responsive to x-ray radiation 18.

Data from reference sensor 58 is analyzed separately, or additionally, than data from other sensors. Data from reference sensor 58 is monitored following time $t_1$. When data from reference sensor 58 exceeds a predetermined threshold, it is assumed that x-ray radiation has reached, or has substantially reached, time $t_2$ indicating that x-ray exposure of object 20 has begun. Hence, at, or near, time $t_3$ data from all other sensors may be read. In this manner, data can be collected from sensors 52 at a time when maximum, or near maximum, exposure dose has been received by object 20 resulting in an optimum x-ray exposure.

Note that the time duration of variable warm-up time period $(t_2-t_1)$ does not matter in the timing of the data acquisition from sensors 52. Hence, the uncertainty of such variable warm-up time period $(t_2-t_1)$ has been eliminated.

Figure 7:
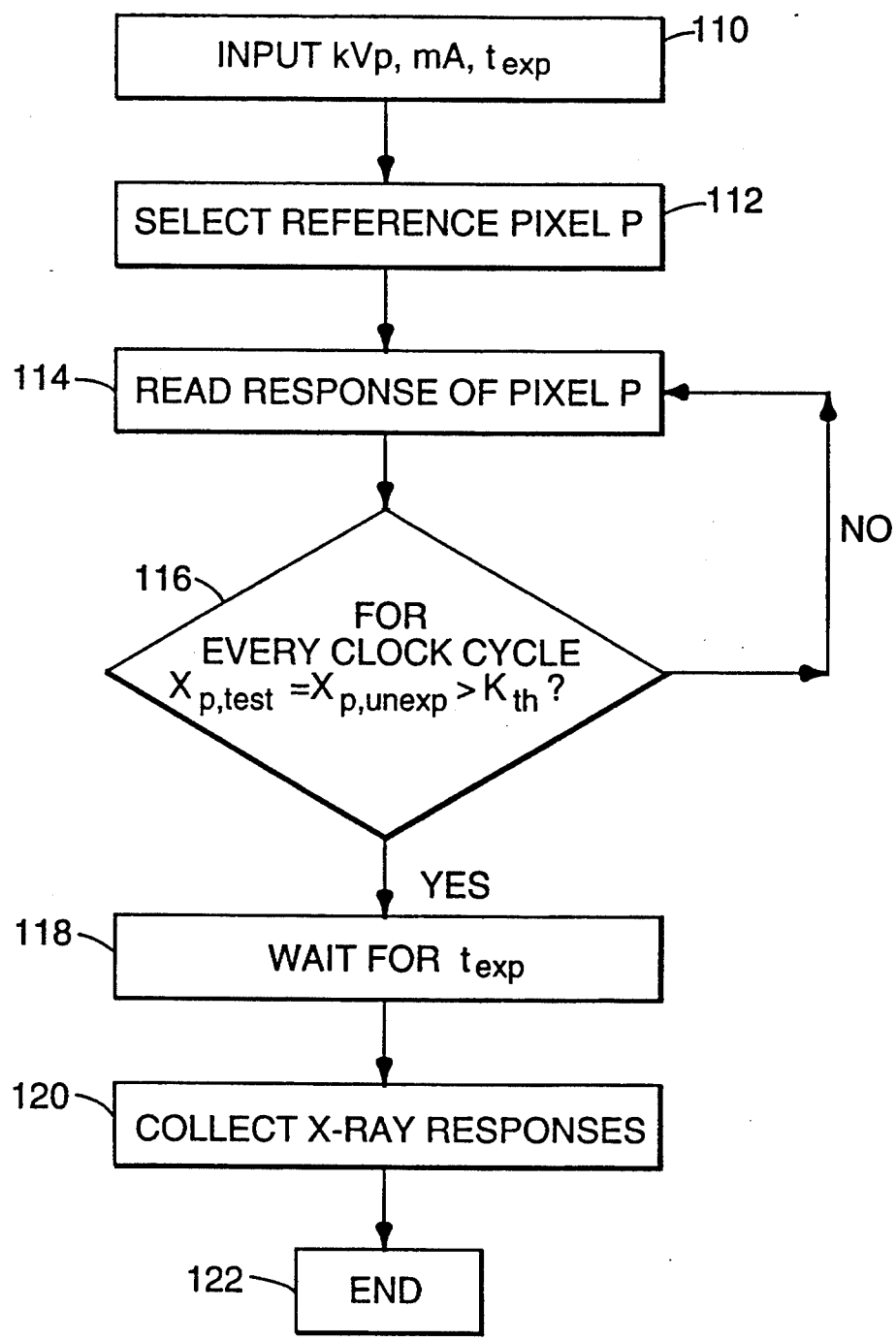
FIG. 7 is a flow chart illustrating a preferred embodiment of the method of reading solid state radiation detection information according to the present invention.

The steps involved in a preferred embodiment of the present invention is illustrated by the flow chart of FIG. 7. First, the values of control parameters associated with the conventional aspects of x-ray machine 24, e.g., exposure time, voltage and current, are selected and entered into x-ray machine 24 through user panel 12 (step 110). The exposure time, $t_{exp}$, is also entered into read-out circuit 60 (shown in FIG. 2). A pixel location, P, is selected from among all of the sensors, photodiodes, of solid state radiation detector 26 and used as a reference pixel (step 112). Before x-ray tube 16 is activated, i.e., before time $t_1$ of FIG. 5, the response of reference pixel P is collected and digitized (step 114). This represents the unexposed response of pixel P and is denoted as $X_{p,unexp}$. When x-ray tube 16 is activated (switched on), at time $t_1$ of FIG. 5, the response of pixel P is collected at every clock cycle of read-out circuit 60 (step 116). This response is denoted as $X_{p,test}$. The starting time of x-ray exposure time, time $t_2$ in FIG. 5, is detected when the difference between $X_{p,unexp}$ and $X_{p,test}$ is greater than a predetermined threshold $k_{th}$. Until this threshold is reached, the method returns to step 114. Once the threshold is reached, the method continues to step 118. Read-out circuit 60 delays the actual "read-out" of the other sensors in sold state radiation detector 26 until the x-ray exposure time is finished, until time $t_3$ in FIG. 5. This is accomplished by calculating the number of clock cycles to be delayed based upon the desired exposure time, $t_{exp}$, which was entered in step 110. The data from all other sensors, preferably including reference sensor(s), is then collected substantially near, preferably exactly at, the time the exposure period is finished, time $t_3$ in FIG. 5. The method ends at step 122.

Figure 8:
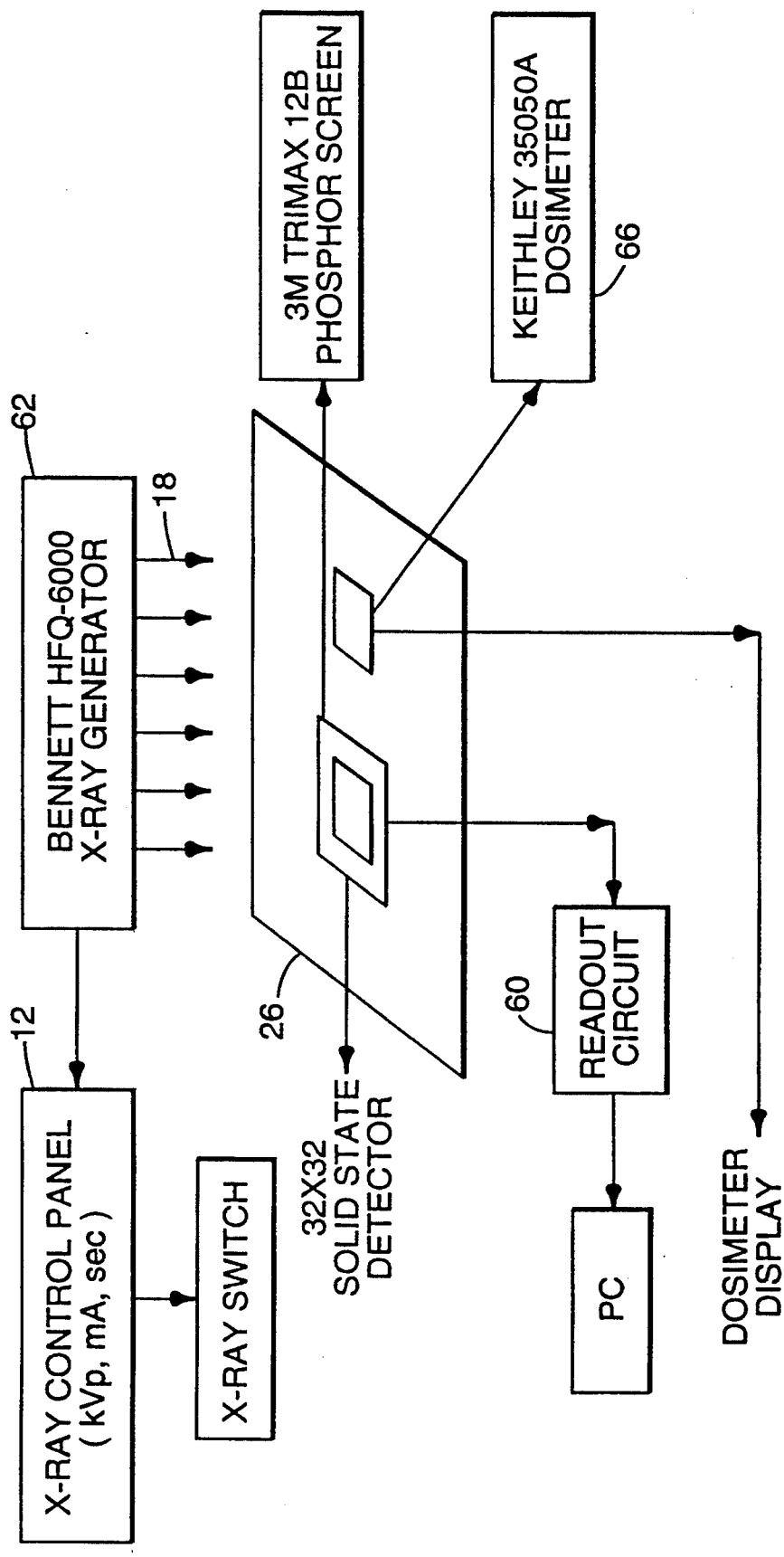
FIG. 8 is a block diagram illustrating a test apparatus for testing the advantageous result of one embodiment of the present invention.

FIG. 8 illustrates a block diagram of a test apparatus used in testing the advantageous result achieved through the present invention. A 32×32 solid state detector 26 was placed under x-ray generator 62, a Bennett HFQ-6000 high frequency x-ray generator which was controlled independently by user panel 12. Solid state detector 26 was connected to read-out circuit 60 and independently controlled by a personal computer. Solid state detector 26 was covered by 3M Trimax 12B phosphor, available from Minnesota Mining and Manufacturing Company, St. Paul, Minn. A Keithley 3505A dosimeter 66 was placed next to solid state detector 26 to accurately measure the x-ray dose.

Figure 9:
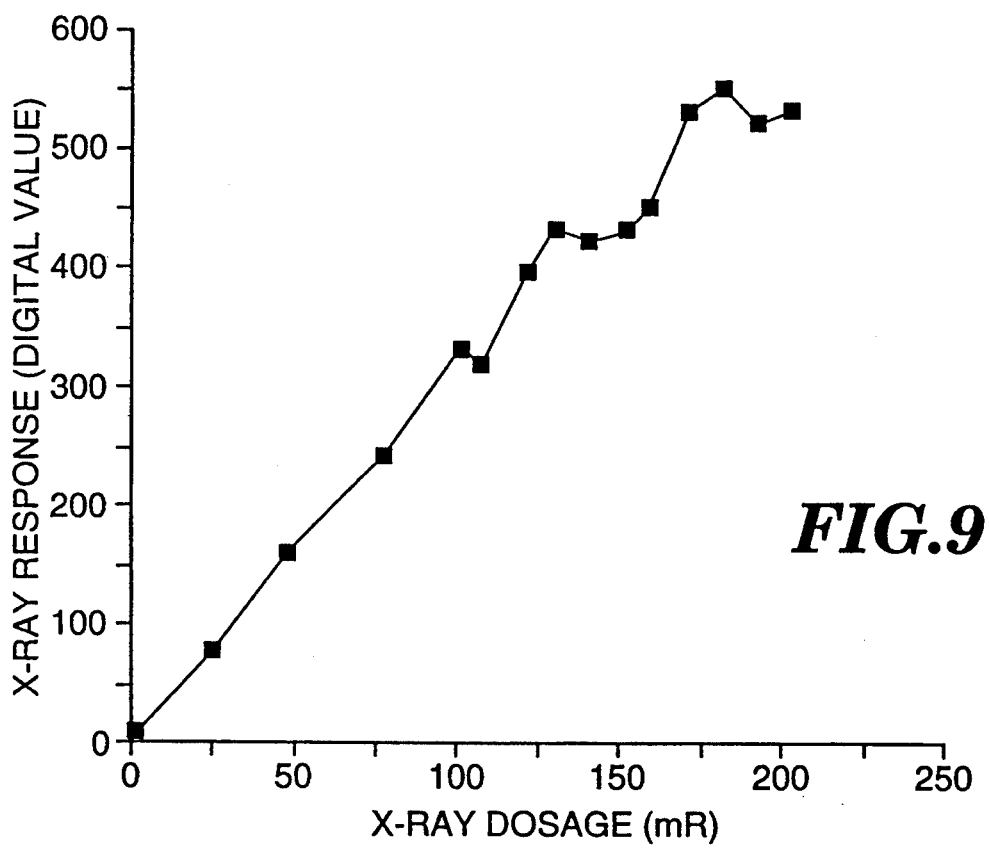
FIG. 9 is a graph illustrating the results of using the test apparatus of FIG. 7 with a prior art solid state radiation detector.

First, the response of solid state detector 26 were collected for different values of x-ray dosages using a constant estimate for the warm-up time period. The synchronization of read-out circuit 60 to the end of x-ray exposure, corresponding to time $t_2$ in FIG. 5, was attempted manually. The result is displayed in FIG. 9 for one pixel on the 32×32 solid state detector 26. The graph illustrated in FIG. 9 shows a plot of the digital value of the response versus the dosage level. It can be seen that the response did not monotonically increase as the x-ray dosage increased, This is probably because read-out started before time $t_2$ or after time $t_3$ in FIG. 5.

Second, the same test setup as described in FIG. 8 was utilized with the method described in FIG. 7. The result is displayed in FIG. 10 showing the response versus dosage level of the same pixel illustrated in FIG. 9. The response of solid state detector 26 increased monotonically as illustrated in FIG. 10 showing a greatly improved accuracy in response.

Figure 11:
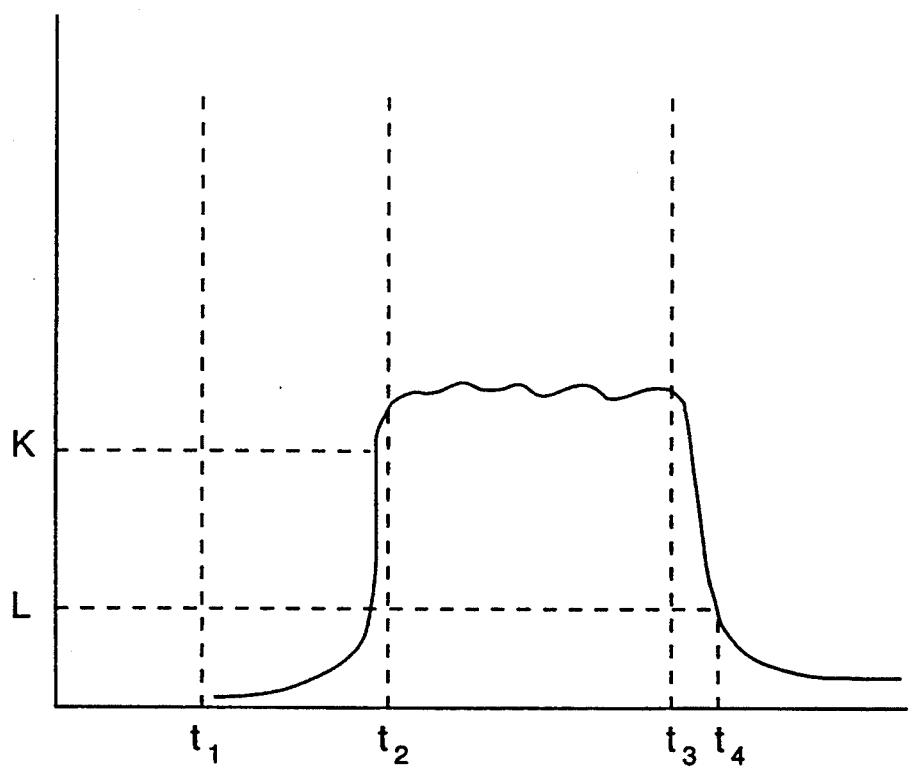
FIG. 11 is a timing diagram illustrating the timing of an alternative embodiment of the solid state radiation detector of FIG. 3.
Figure 12:
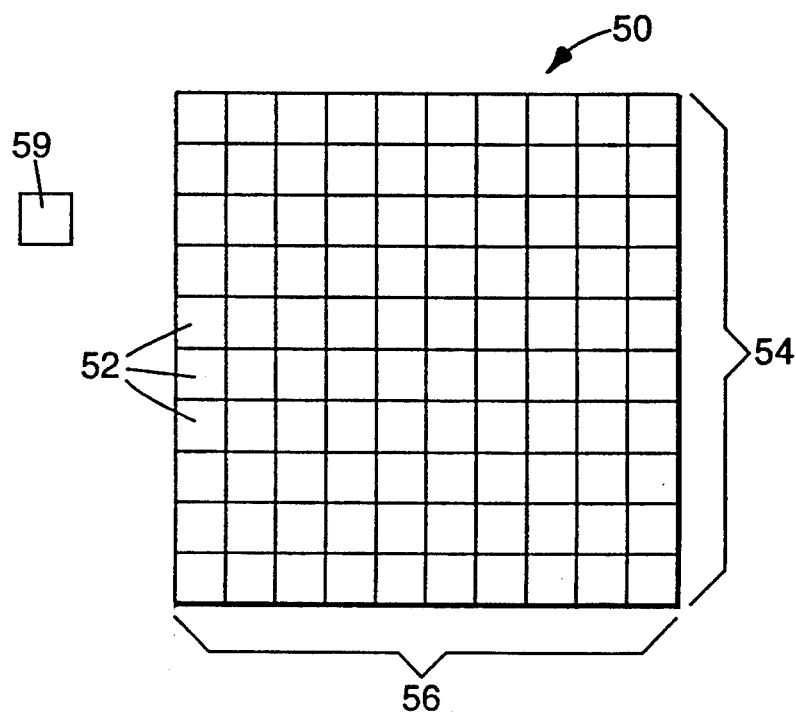
FIG. 12 is a schematic representation of sensor elements and an external reference sensor utilized with an embodiment of the present invention.

FIG. 11 illustrates an alternative timing diagram showing an alternative method to properly read information from array 50 using reference pixel 59 (as illustrated in FIG. 12) located external to array but in proximity to array 50 and arranged to receive a proportionate amount of radiation that array 50 receives. Reference pixel 59 is utilized to sense information about the radiation exposure as illustrated in FIG. 12. The abscissa of the timing diagram of FIG. 11 is time and the ordinate represents amount of radiation received by solid state radiation detector 26 as evidenced by the value of reference detector 59.

Unlike the time diagram illustrated in FIG. 5, the alternative time diagram of FIG. 11 does not depend upon knowledge of the exposure time determined by the x-ray technician. Instead, the x-ray technician (after setting the appropriate parameters on x-ray machine 24)

activates x-ray tube 16 at time $t_1$. The time period between time $t_1$ and the end of warm up time, at time $t_2$, represents the amount of time required for x-ray tube 16 to warm up. Again, this delay time is greatly variable and depends upon the values of the required parameters, the ambient temperature, the length of time since x-ray tube 16 was last activated and other factors. Thus, the delay time is not often known in advance and is not predictable.

Following the end of warm up time, at time $t_2$, object exposure time starts at and continues for the duration set by the x-ray technician or otherwise determined by x-ray machine 24. During the object exposure time, the object being x-rayed continues to receive radiation until x-ray tube 16 is deactivated at time $t_3$. Likewise, the amount of radiation reaching each of the photodetectors increases and the output of the photodetectors also increases (unless, of course, radiation is blocked from reaching any photodetector due to the shadow of the object being x-rayed). Following time $t_3$, no more radiation will reach any of the photodetectors and the output of the photodetectors will begin to fall. This decrease will generally be exponential and dependent upon parameters particular for each individual detector. Data from each of the photodetectors associated with solid state radiation detector 26 should be "read-out" at or near time $t_3$ since the x-ray dose reaches its maximum at that point. If data were "read-out" substantially before time $t_3$, the data would not have its maximum value since the maximum exposure dose would not have been yet reached. If data were "read-out" substantially after time $t_3$, image acquisition time would be increased and data might not have its maximum value due to possible decay or saturation in the exposure detectors.

The duration of the time between activation time $t_1$ and the end of warm up time $t_2$ is not known, and the time between activation time $t_1$ and the end of exposure time $t_3$ is also not known. Further, since solid state radiation detector 26 may need to be retrofit into an existing x-ray machine 24 and since it is desirable not to need to make electrical interconnections between existing x-ray machine 24 and added solid state radiation detector 26, the parameters set by the x-ray technician relating to the length of the exposure time may not be available to solid state radiation detector 26. Thus, solid state radiation detector 26 may need to determine the proper "read-out" time without having any knowledge of the length of time between time $t_2$ and $t_3$ as set by the x-ray technician.

In order to determine the near optimum for reading out the data associated with each photodetector, reference photodetector 59 is monitored (following activation time $t_1$) until the output of reference photodetector reaches a first predetermined value K. Generally, this predetermined value should be selected to be above random noise levels but sufficiently low not to be above actual maximum radiation exposure read out levels. Predetermined value K may be selected to be generally indicative that end of warm up time $t_2$ but before maximum exposure level at time $t_3$. Any predetermined value K may be selected such that it is high enough to ensure that x-ray tube 16 has been activated and low enough to ensure that radiation exposure (absent blockage by object 20 being x-rayed) will result in an output from reference photodetector 59 which will exceed such value. Next, reference photodetector 59 is monitored to determine when the value of the output of reference photodetector to decrease to a second predetermined, threshold L. Generally, this predetermined value L should be selected to be lower than the first predetermined threshold to indicate that the value of reference photodetector 59 has begun to decay indicating that time $t_3$ has passed. Thus, the output of reference photodetector 59 will be below the value predetermined threshold L and be falling. The output of reference photodetector 59 is monitored for existence of the falling output value. As soon as the output of reference photodetector 59 falls below second predetermined threshold L (at time $t_4$), data is "read out" from the sensors 52 just after the point of maximum output (time $t_3$).

Note that the time duration of variable warm-up time period does not matter in the timing of the data acquisition from sensors 52. Also note that the time duration of the exposure time is also not need to be known. Hence, not only has the uncertainty of such variable warm-up time period been eliminated but there is no need for the read out circuit 60 to have any direct connection or to receive any data from x-ray machine 24 beyond knowing that x-ray tube 16 has been activated.

Figure 13:
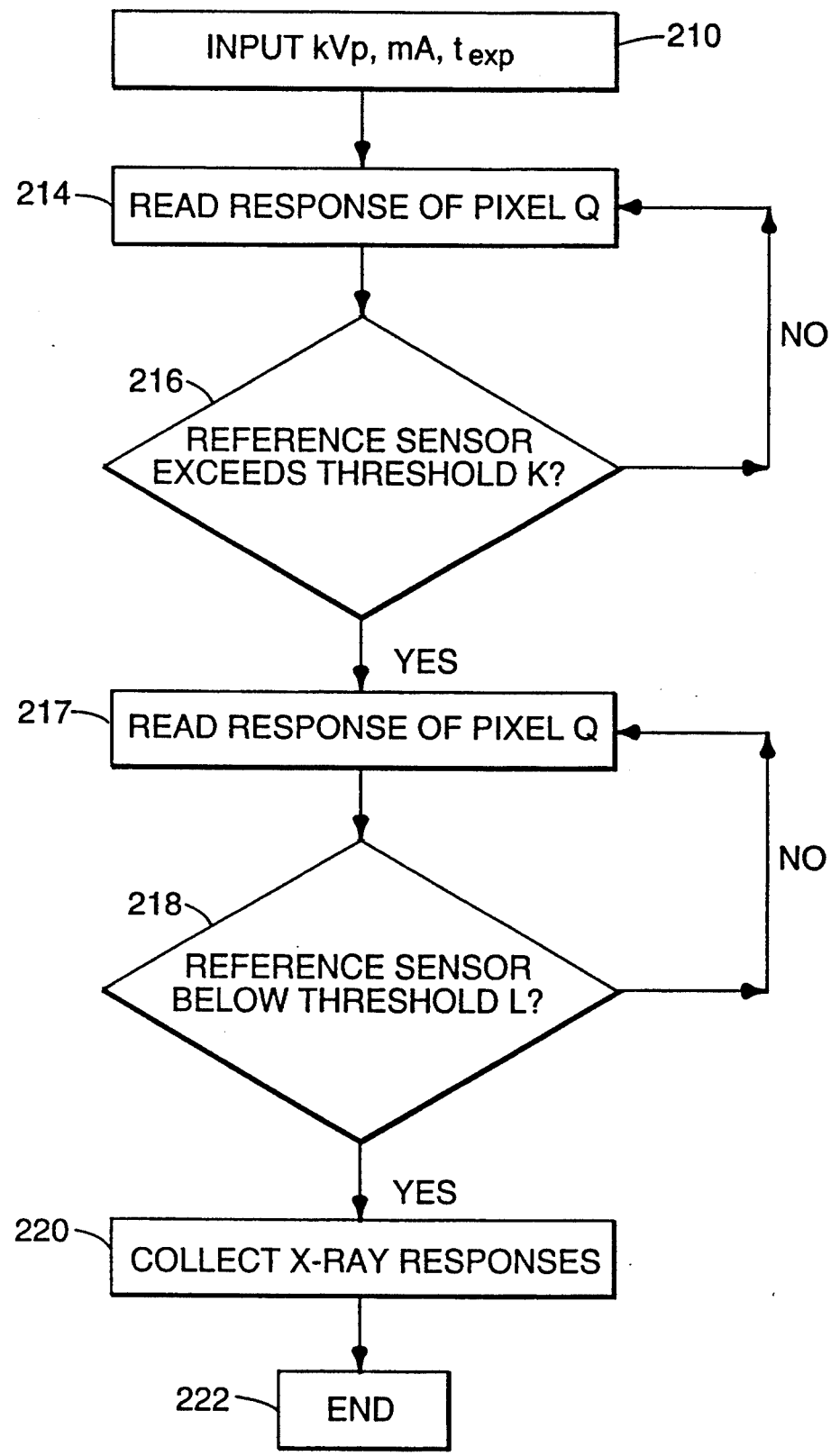
FIG. 13 is a flow chart illustrating an alternative method of reading solid state radiation detection information according to another embodiment of the present invention.

The steps involved in a preferred embodiment of the present invention is illustrated by the flow chart of FIG. 13. First, the value of control parameters associated with the conventional aspects of x-ray machine 24, e.g., exposure time, voltage and current, are selected and entered into x-ray machine 24 through user panel 12 (step 210). It is not necessary to enter the exposure time, $t_{exp}$, into read-out circuit 60 (shown in FIG. 2). Before x-ray tube 16 is activated, i.e., before activation time $t_1$ of FIG. 11, the response of reference pixel 59 is collected and digitized (step 214). This represents the unexposed response of reference pixel 59 and is denoted as $X_{Q,unexp}$. When x-ray tube 16 is activated (switched on), at activation time $t_1$ of FIG. 11, the response of reference pixel 59 is collected at every clock cycle of read-out circuit 60 (step 21 6). This response is denoted as $X_{Q,test}$. Whether the difference between $X_{Z,unexp}$ and $X_{Q,test}$ is greater than a first predetermined threshold $k_{th}$ is monitored. Until this threshold is reached, the method returns to step 214. Once the threshold is reached, the method continues to step 217 where the response of reference pixel 59 is again collected and digitized. The response of reference pixel 59 is then collected at every subsequent clock cycle of read-out circuit 60 (step 218). Whether the difference between $X_{Q,unexp}$ and $X_{Q,test}$ is smaller than a second predetermined threshold $I_{th}$ is monitored. Until this second threshold is reached, the method returns to step 217. Once the threshold is reached, the method continues to step 220. Read-out circuit 60 then "reads-out" the sensors 52 in sold state radiation detector 26 and the x-ray exposure is finished, at time $t_4$ in FIG. 11. The method ends at step 222.

Figure 14:
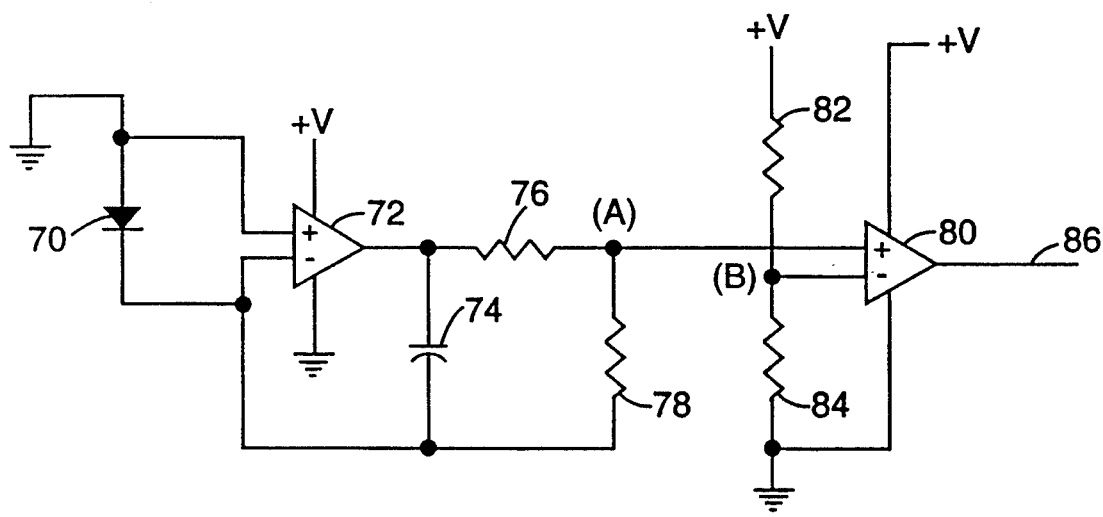
FIG. 14 is a detailed schematic diagram of a circuit to detect optimum readout time in one embodiment of the present invention.

An example of a preferred circuit for detecting when the amount of radiation received by reference pixel 59, first, exceeds threshold K and, subsequently, falls below threshold L is the standard edge detection (or "rise up/fall down") circuitry illustrated in FIG. 14. Reference pixel 59 is sensed by photodiode 70 (BPW34), a phosphor coated sensor, feeds operational amplifier 72 (MAX419). The output of operational amplifier 72 is fed through capacitor 74 (47 picofarads) and resistors 76 (47 ohms) and 78 (10 megohms) to reference point A and the positive input to comparator 80 (MAX934). The negative input to comparator 80 is supplied from a voltage divider consisting of resistor 82 (470 kilohms) connected a voltage source and resistor 84 (1 megohm) connected to ground.

For example, reference point B is set to be 0.38 volts. Before the radiation to be received is activated, reference point A is less than 0.15 volts and output 86 is a logical low (0 volts). When radiation is received by photodiode 70, reference point A must go higher than 0.4 volts for output 86 to become a logical high (5 volts). When radiation is no longer being received by photodiode 86, reference point A will drop below 0.1 volts forcing output 86 back to a logical low (0 volts). Output 86 must first go from low to high indicating that threshold K has been reached and subsequently go from high to low indicating that threshold L has been reached before solid state radiation detector 26 will read data from sensors 52.

Thus, it can be seen that there has been shown and described a novel invention. It is to be recognized and understood, however, that various changes, modifications and substitutions in the form and the details of the present invention may be made by those skilled in the art without departing from the scope of the invention as defined by the following claims.

What is claimed is:

1. An x-ray machine for producing an x-ray, comprising:
   an x-ray tube powered by electrical power and producing x-ray radiation, said x-ray tube having a variable warm-up time period;
   a controller for controlling said x-ray tube controlling an exposure time for said x-ray radiation;
   a layer of phosphor receiving said x-ray radiation and producing an output based upon the amount of said x-ray radiation received;
   a solid state radiation detector having a plurality solid state sensors arranged in an array of sensors consisting of a plurality of rows and a plurality of columns, said detector responsive to said output of said layer of phosphor, each of said plurality of solid state sensors producing an output;
   at least one solid state reference sensor;
   sensing means coupled to each of said plurality of solid state sensors and to said solid state reference sensor for sensing said output of said solid state sensors;
   said sensing means reading said output of said reference sensor at a time $t_1$;
   said controller applying said electrical power to said x-ray tube at said time $t_1$;
   said sensing means continuing to read said output of said reference sensor after time $t_1$ and determining a time $t_2$ based upon said output of said reference sensor at time $t_2$ as compared with said output of said reference sensor at time $t_1$;
   said sensing means reading said output of said plurality of solid state sensors at time $t_3$ which is equal to said time $t_2$ plus said exposure time; and
   recording means responsive to said sensing means for recording the value of said output of said plurality of solid state sensors at time $t_3$;
   whereby an x-ray image is produced in spite of said x-ray tube having a variable warm-up time period.

2. An x-ray machine as in claim 1 wherein said sensing means determines said time $t_2$ by determining the time at which the value of said output of said reference sensor minus the value of said output of said reference sensor at time $t_1$ first exceeds a predetermined threshold.

3. A solid state radiation detector adapted to detect radiation from a radiation source having a variable initialization period following a time $t_1$, comprising:
   an array of solid state sensors consisting of a plurality of rows and a plurality of columns and adapted to be responsive to radiation from said radiation source, each of said solid state sensors producing an output;
   at least one solid state reference sensor;
   sensing means coupled to each of said solid state sensors and to said solid state reference sensor for sensing said output of said solid state sensors;
   said sensing means reading said output of said reference sensor at said time $t_1$;
   said sensing means reading said output of said reference sensor after time $t_1$ and determining a time $t_2$ based upon said output of said reference sensor as compared with said output of said reference sensor at time $t_1$;
   said sensing means reading said output of said solid state sensors at a time $t_3$ which is equal to said time $t_2$ plus said exposure time; and
   recording means responsive to said sensing means for recording the value of said output of said plurality of solid state sensors at time $t_3$.

4. A solid state radiation detector as in claim 3 wherein said sensing means determines said time $t_2$ by determining the time at which the value of said output of said reference sensor minus the value of said output of said reference sensor at time $t_1$ first exceeds a predetermined threshold.

5. A solid state radiation detector as in claim 4 wherein said initialization period comprises a warm-up period of said radiation source.

6. A solid state radiation detector adapted to detect radiation from a radiation source having a variable initialization period, said radiation source intended to expose said radiation detector for a predetermined exposure time, comprising:
   a plurality solid state sensors arranged in an array of sensors adapted to be responsive to radiation from said radiation source, each of said plurality of solid state sensors producing an output;
   at least one of said plurality of solid state sensors being designated a reference sensor;
   determining means for determining when said radiation source has completed said initialization period by monitoring said output of said reference detector; and
   reading means for reading said output of said plurality of solid state sensors when said determining means determines that said warm-up period has been completed and said predetermined exposure period has been completed.

7. A method of reading radiation detection information from a solid state radiation detector having a plurality solid state sensors arranged in an array consisting of a plurality of rows and a plurality of columns, each of said plurality of solid state sensors producing an output, said radiation detector being responsive to radiation from a radiation source having a variable initialization period beginning at a time $t_1$, comprising the steps of:
   designating at least one of said plurality of solid state sensors as a reference sensor;
   sensing said output of said reference sensor at and following said time $t_1$;

determining a time $t_2$ based upon said output of said reference sensor as compared with said output of said reference sensor at time $t_1$;

reading said output of said plurality of solid state sensors at a time $t_3$ which is equal to said time $t_2$ plus said exposure time; and recording the value of said output of said plurality of solid state sensors at said time $t_3$.

8. A method as in claim 7 wherein said time $t_2$ in said determining step is determined by the time at which the value of said output of said reference sensor minus the value of said output of said reference sensor at time $t_1$ exceeds a predetermined threshold.

9. A method as in claim 8 wherein said initialization period comprises a warm-up period of said radiation source.

10. A method of reading radiation detection information from a solid state radiation detector having a plurality solid state sensors, each of said plurality of solid state sensors producing an output, said radiation detector being responsive to radiation from a radiation source having a variable initialization period, said radiation source intended to expose said radiation detector for a predetermined exposure period, comprising the steps of:

designating at least one of said plurality of solid state sensors as a reference sensor;

determining when said radiation source has completed said initialization period by monitoring said output of said reference detector;

reading said output of said plurality of solid state sensors when said determining step indicates that said warm-up period has been completed and said predetermined exposure period has been completed.

11. A method as in claim 10 wherein said determining step is accomplished by determining the time at which the value of said output of said reference sensor minus the value of said output of said reference sensor exceeds a predetermined threshold.

12. A method as in claim 11 wherein said initialization period comprises a warm-up period following an application of power to said solid state radiation detector.

13. An x-ray machine for producing an x-ray, comprising:

an x-ray tube powered by electrical power and producing x-ray radiation, said x-ray tube having a variable warm-up time period following an activation time;

a layer of phosphor receiving said x-ray radiation and producing an output based upon the amount of said x-ray radiation received;

a solid state radiation detector having a plurality solid state sensors, said detector responsive to said output of said layer of phosphor, each of said plurality of solid state sensors producing an output;

at least one reference sensor producing an output;

sensing means coupled to each of said plurality of solid state sensors for sensing said output of said solid state sensors;

determining means coupled to said output of said reference sensor for first determining when said output of said reference sensor exceeds a first predetermined threshold and then determining a readout time when said output of said reference sensor falls below a second predetermined threshold;

recording means responsive to said sensing means for recording the value of said output of said plurality of solid state sensors at said readout time;

whereby an x-ray image is produced in spite of said x-ray tube having a variable warm-up time period.

14. A solid state radiation detector adapted to detect radiation from a radiation source having a variable initialization period following an activation time, comprising:

an array of solid state sensors adapted to be responsive to radiation from said radiation source, each of said solid state sensors producing an output;

at least one reference sensor producing an output;

sensing means coupled to each of said solid state sensors for sensing said output of said solid state sensors;

determining means coupled to said output of said reference sensor for first determining when said output of said reference sensor exceeds a first predetermined threshold and then determining a readout time when said output of said reference sensor falls below a second predetermined threshold;

recording means responsive to said sensing means for recording the value of said output of said plurality of solid state sensors at readout time.

15. A solid state radiation detector as in claim 14 wherein said initialization period comprises a warm-up period of said radiation source.

16. A solid state radiation detector adapted to detect radiation from a radiation source having a variable initialization period following an activation time, comprising:

a plurality of solid state sensors arranged in an array adapted to be responsive to radiation from said radiation source, each of said plurality of solid state sensors producing an output;

a reference sensor;

sensing means coupled to each of said solid state sensors for sensing said output of said solid state sensors;

determining means coupled to said output of said reference sensor for first determining when said output of said reference sensor exceeds a first predetermined threshold and then determining a readout time when said output of said reference sensor falls below a second predetermined threshold;

recording means responsive to said sensing means for recording the value of said output of said plurality of solid state sensors at readout time.

17. A method of reading radiation detection information from a solid state radiation detector having a plurality solid state sensors and a reference sensor, each of said plurality of solid state sensors producing an output, said radiation detector being responsive to radiation from a radiation source having a variable initialization period following an activation time, comprising the steps of:

sensing said output of said reference sensor following said activation time;

determining when said output of said reference sensor exceeds a first predetermined threshold;

then determining a readout time when said output of said reference sensor falls below a second predetermined threshold; and recording the value of said output of said plurality of solid state sensors at said readout time.

18. A method as in claim 17 wherein said initialization period comprises a warm-up period of said radiation source.

* * * * *

UNITED STATES PATENT AND TRADEMARK OFFICE
CERTIFICATE OF CORRECTION

PATENT NO. : 5,444,756
DATED : August 22, 1995
INVENTOR(S) : Pai et al.

It is certified that error appears in the above-indentified patent and that said Letters Patent is hereby corrected as shown below:

Column 2, line 31, delete "862-874"

and insert --867-874--.

Column 14, line 39, delete "$X_{Z,unexp}$"

and insert --$X_{Q,unexp}$--.

Signed and Sealed this

Second Day of January, 1996

Attest:

BRUCE LEHMAN

Attesting Officer     Commissioner of Patents and Trademarks